US010543429B2

United States Patent
Kojima et al.

(10) Patent No.: US 10,543,429 B2
(45) Date of Patent: Jan. 28, 2020

(54) RECORDING MEDIUM WHEREUPON GAME PROGRAM IS RECORDED, EFFECT CONTROL METHOD, AND GAME DEVICE

(71) Applicant: CAPCOM CO., LTD., Osaka (JP)

(72) Inventors: Kenji Kojima, Osaka (JP); Yuki Noto, Osaka (JP); Wataru Hachisako, Osaka (JP); Yuji Higashiyama, Osaka (JP)

(73) Assignee: CAPCOM CO., LTD., Osaka-Shi, Osaka (JP)

( * ) Notice: Subject to any disclaimer, the term of this patent is extended or adjusted under 35 U.S.C. 154(b) by 61 days.

(21) Appl. No.: 16/060,722

(22) PCT Filed: Dec. 7, 2016

(86) PCT No.: PCT/JP2016/086298
§ 371 (c)(1),
(2) Date: Jun. 8, 2018

(87) PCT Pub. No.: WO2017/099098
PCT Pub. Date: Jun. 15, 2017

(65) Prior Publication Data
US 2018/0361246 A1    Dec. 20, 2018

(30) Foreign Application Priority Data
Dec. 9, 2015  (JP) ................. 2015-239814

(51) Int. Cl.
*A63F 13/577*  (2014.01)
*G06T 13/40*  (2011.01)
(Continued)

(52) U.S. Cl.
CPC ............ *A63F 13/577* (2014.09); *A63F 13/54* (2014.09); *G06T 13/40* (2013.01)

(58) Field of Classification Search
None
See application file for complete search history.

(56) References Cited

U.S. PATENT DOCUMENTS 6,552,729 B1 * 4/2003 Di Bernardo ........... G06T 13/20
                                                           345/473
2008/0139307 A1 * 6/2008 Ueshima .............. A61B 5/0002
                                                           463/31
(Continued)

FOREIGN PATENT DOCUMENTS

JP    2001-160150 A   6/2001
JP    2005-218706 A   8/2005
(Continued)

OTHER PUBLICATIONS

International Search Report issued for corresponding PCT/JP2016/086298 application.

*Primary Examiner* — Robert T Clarke, Jr.
(74) *Attorney, Agent, or Firm* — IP Business Solutions, LLC

(57) ABSTRACT

PROBLEM
To appropriately produce a sound effect caused by an action of an object when the object is made to perform an action such as jogging.
SOLUTION
An object is made to perform an action in which two or more sets of motion data are blended, each one of two or more sets of sequence data associated with two or more motion data are switched depending on a blend condition, and an effect is produced with reference to the switched sequence data. Also, cumulative number of times of produced effects in a correction period before the switch of the sequence data is counted. No effect is produced in the correction period after the switch if a predetermined number of times of effects has produced before the switch, and a predetermined number of times of effects is produced in the correction period after the switch if a predetermined number of times of effects have not produced before the switch.

7 Claims, 12 Drawing Sheets

(51) Int. Cl.
*A63F 13/54* (2014.01)
*A63F 13/52* (2014.01)
*A63F 13/55* (2014.01)

(56) References Cited

U.S. PATENT DOCUMENTS

2010/0302257 A1\* 12/2010 Perez ................. G06T 7/251
  345/474
2011/0012903 A1\* 1/2011 Girard ................ G06T 13/40
  345/474

FOREIGN PATENT DOCUMENTS

| JP | 2007-167323 A | 7/2007 |
| JP | 2009-45273 A | 3/2009 |
| JP | 2011-253308 A | 12/2011 |

\* cited by examiner

FIG.2A

MOTION DATA (WALK) — M1

| FRAME | JOINT A | JOINT B | ... |
|---|---|---|---|
| 1 | *** | *** | ... |
| 2 | *** | *** | ... |
| M | *** | *** | ... |

MOTION DATA (RUN) — M2

| FRAME | JOINT A | JOINT B | ... |
|---|---|---|---|
| 1 | *** | *** | ... |
| 2 | *** | *** | ... |
| N | *** | *** | ... |

FIG.2B

| SEQUENCE DATA (WALK) | | | S1 |
|---|---|---|
| FRAME | EFFECT PRODUCTION TIMING | CORRECTION PERIOD |
| 1 | EFFECT ID | FRAME IN WHICH DESIGNATED NUMBER OF TIMES ENDS |
| 2 | *** | *** |
| M | *** | *** |

| SEQUENCE DATA (RUN) | | | S2 |
|---|---|---|
| FRAME | EFFECT PRODUCTION TIMING | CORRECTION PERIOD |
| 1 | EFFECT ID | FRAME IN WHICH DESIGNATED NUMBER OF TIMES ENDS |
| 2 | *** | *** |
| N | *** | *** |

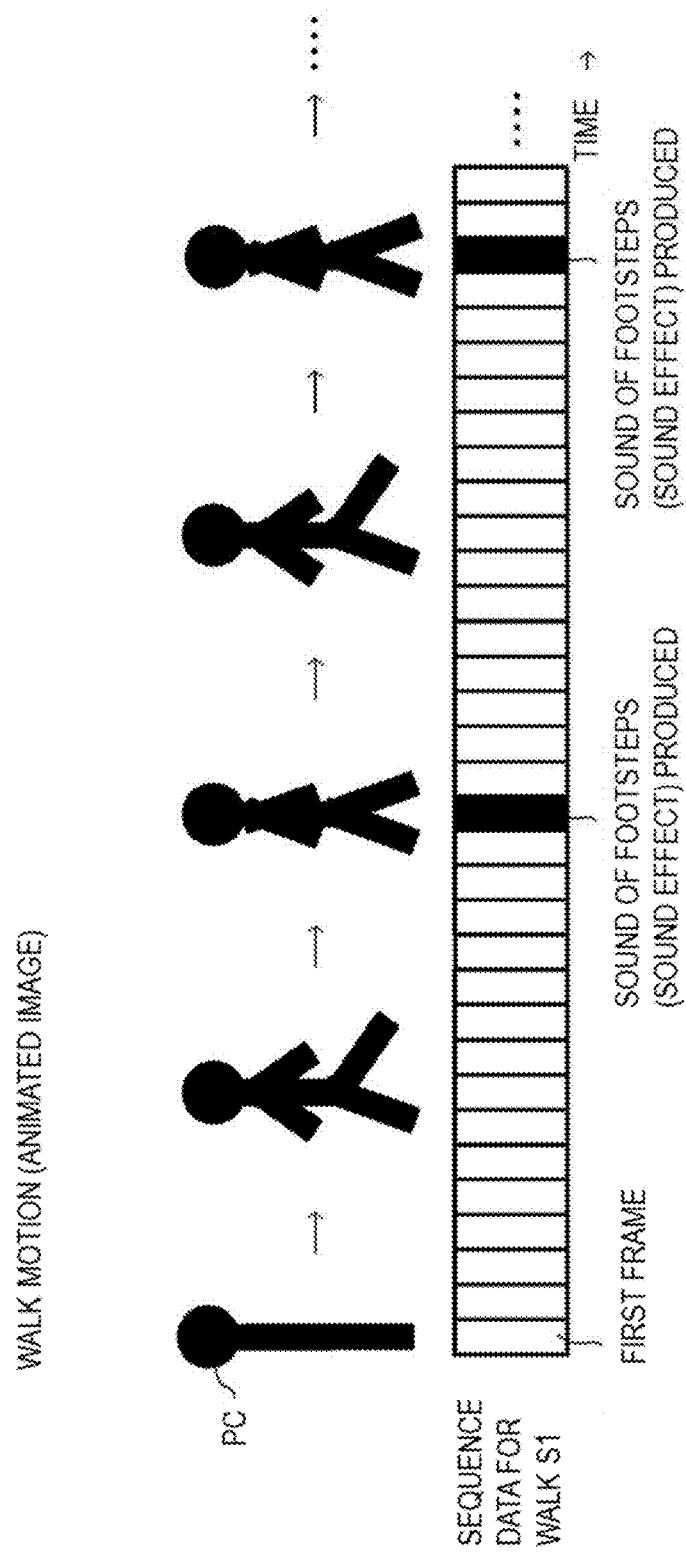

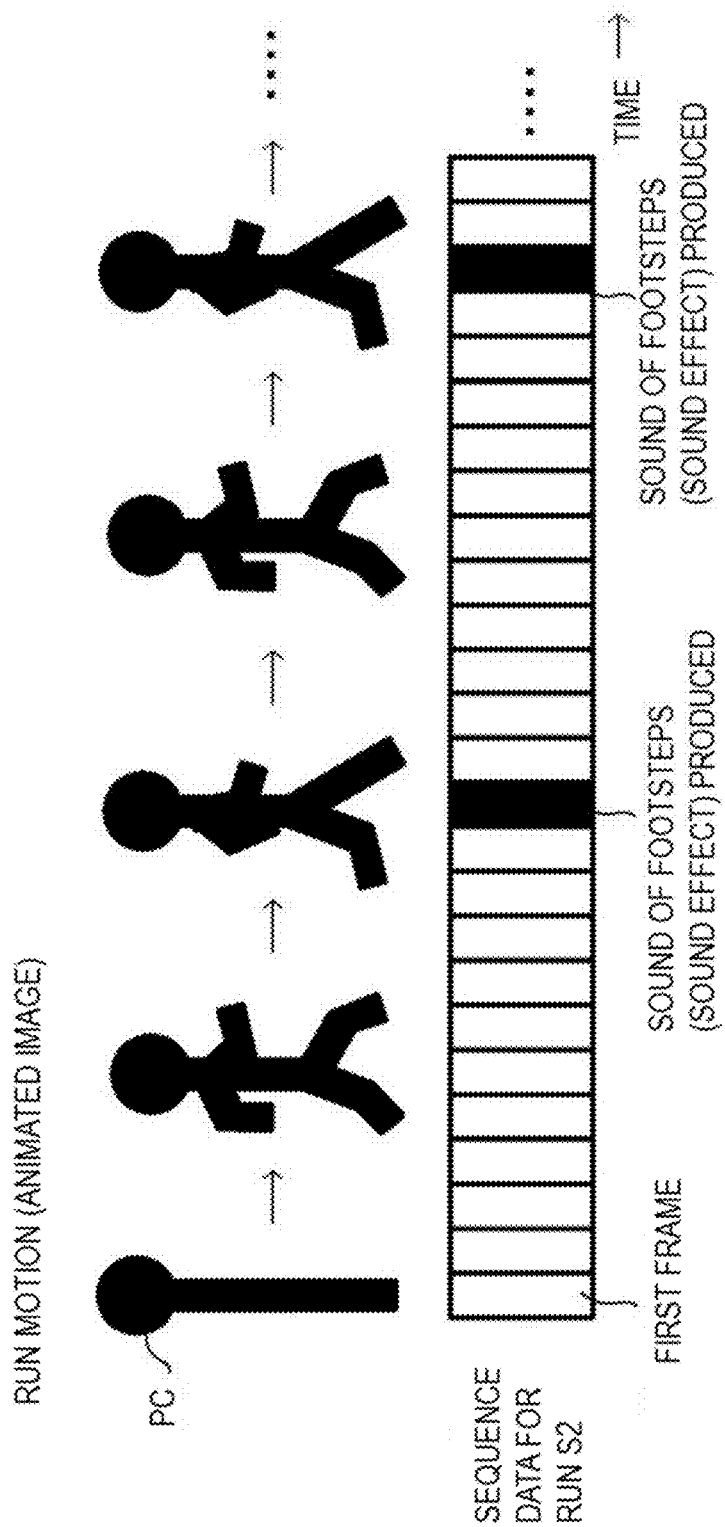

RECORDING MEDIUM WHEREUPON GAME PROGRAM IS RECORDED, EFFECT CONTROL METHOD, AND GAME DEVICE

TECHNICAL FIELD

The present invention relates to a recording medium whereupon a game program that causes an object to act in accordance with motion data is recorded, an effect control method, and a game device.

BACKGROUND ART

In a video game field, actions of an object (a character) of walking, running, etc., in a virtual three-dimensional space are reproduced using motion data (e.g., see Patent Literature 1). The motion data includes data for changing a posture of a character across a plurality of frames (from a first frame to an nth frame) of a video image. This information includes position information of joints which are components of the character.

The frames from the first frame to the nth frame correspond to, for example, the number of reproduction frames that form a single unit of action. In walking, for example, an action of putting the right foot and the left foot alternately forward one by one is a single unit of action. Therefore, a single unit of action of a character is reproduced by generating the character in postures in accordance with data in an order of the frames from the first frame to the nth frame. Regarding the motion data, a plurality of sets of motion data are prepared as game data for a plurality of actions.

In video games, sound effects, etc., are output in response to the actions of the character. For example, with the walking action of the character, a sound effect representing sound of footsteps is output each time the foot of the character touches the ground. The sound effect is output in accordance with sequence data associated with the motion data. As in the motion data, the sequence data for each frame is prepared in time series for the frames from the first frame to the nth frame. The sequence data is, for example, data for identifying timing at which the above-described sound effect is to be produced (a production frame). Production timing is set in, for example, an appropriate frame while a manufacturer of the video game plays the actions of the character.

In some recent video games, a character is made to perform an action in which two sets of motion data are blended. For example, motion data for walk and motion data for run are blended to cause the character to jog, which is an action between walk and run. The character is caused to jog when, for example, position information of joints included in frames of the motion data for walk and frames of the motion data for run that are associated with each other are blended in accordance with a blend rate. Also, a jogging action close to walking (or running) can be expressed in accordance with the blend rate.

CITATION LIST

Patent Literature

Patent Literature 1: Japanese Laid-Open Patent Application Publication No. 2011-253308

SUMMARY OF THE INVENTION

Problems to be Solved by the Invention

By blending the above-described two sets of motion data, a character is made to perform a single action in which two actions are blended. However, a blend of two sets of sequence data that produces an effect is difficult. For example, when two sets of sequence data associated with two sets of motion data of walk and run are blended, timing at which a foot of the character touches the ground may not coincide with timing at which a sound effect (sound of footsteps) is produced, or sound of footsteps may be produced twice while the foot touches the ground once.

An object of the invention is, when causing an object to perform an action in which two or more sets of motion data are blended, to appropriately produce an effect caused by the action using sequence data associated with each set of motion data.

Means for Solving the Problems

A non-transitory computer-readable recording medium storing a game program for driving a computer to function as:

an acquisition means configured to acquire, from a storage unit, a plurality of sets of motion data that cause an object in a game space to perform an action, and sequence data associated with each set of the motion data;

an object control means configured to cause the object to perform an action based on the motion data and information which is a blend of two or more sets of the motion data;

a switch means configured to switch among two or more sets of sequence data associated with each of two or more motion data depending on the blend condition;

a counting means configured to count a cumulative number of times of produced effects in a correction period before switching the sequence data by the switch means; and an effect control means configured to produce no effect in the correction period after the switch of the sequence data if a predetermined number of times of effects has produced before the switch, and produce the predetermined number of times of effects in the correction period after the switch of the sequence data if the predetermined number of times of effects have not produced before the switch, wherein the sequence data includes production timing of an effect to be produced during the action of the object based on the motion data and information about the correction period in which a cumulative number of times of the produced effects during the period is set to the predetermined number of times in time series.

An effect control method comprising:

a first step to acquire, from a storage unit, a plurality of sets of motion data that cause an object in a game space to perform an action, and sequence data associated with each set of the motion data;

a second step to cause the object to perform an action based on the motion data and information which is a blend of two or more sets of the motion data;

a third step to switch among two or more sets of sequence data associated with each of two or more motion data depending on the blend condition;

a fourth step to produce the effect with reference to the sequence data switched in the third step;

a fifth step to count a cumulative number of times of produced effects in a correction period before switching the sequence data in the third step; and a fifth step to produce no effect in the correction period after the switch of the sequence data if a predetermined number of times of effects has produced before the switch, and produce the predetermined number of times of effects in the correction period after the switch of the sequence data if the predetermined number of times of effects have not produced before the switch, wherein the sequence data includes production timing of an effect to be produced during the action of the object based on the motion data and information about the correction period in which a cumulative number of times of the produced effects during the period is set to the predetermined number of times in time series.

A game device comprising:

a storage unit configured to store a plurality of sets of motion data that cause an object in a game space to perform an action, and sequence data associated with each set of the motion data;

an acquisition unit configured to acquire the motion data and the sequence data from the storage unit;

an object control unit configured to cause the object to perform an action based on the motion data and information which is a blend of two or more sets of the motion data;

a switch unit configured to switch among two or more sets of sequence data associated with each of two or more motion data depending on the blend condition;

a counting unit configured to count a cumulative number of times of produced effects in a correction period before switching the sequence data by the switch unit; and an effect control unit configured to produce no effect in the correction period after the switch of the sequence data if a predetermined number of times of effects has produced before the switch, and produce the predetermined number of times of effects in the correction period after the switch of the sequence data if the predetermined number of times of effects have not produced before the switch, wherein the sequence data includes production timing of an effect to be produced during the action of the object based on the motion data and information about the correction period in which a cumulative number of times of the produced effects during the period is set to the predetermined number of times in time series.

Effect of the Invention

According to the invention, when causing an object to perform an action in which two or more sets of motion data are blended, either one of two or more sequence data associated with each set of motion data is selected and an effect caused by the action of the object can be appropriately produced.

BRIEF DESCRIPTION OF THE DRAWINGS

FIG. 2A is a diagram illustrating an example of two sets of motion data for walk and run.

FIG. 2B is a diagram illustrating two sets of sequence data for walk and run.

FIG. 3A is an explanatory view illustrating a relationship between a walking action and sound of footsteps of a player character PC.

FIG. 3B is an explanatory view illustrating a relationship between a running action and sound of footsteps of a player character PC.

MODE FOR CARRYING OUT THE INVENTION

A game system which is an image processing system of an embodiment of the invention will be described with reference to the drawings. A configuration of the invention is not limited to the embodiment. Also, the process procedure of each flowchart is not limited to that of the embodiment, and may be changed unless inconsistency, etc., arises.

Figure 1:
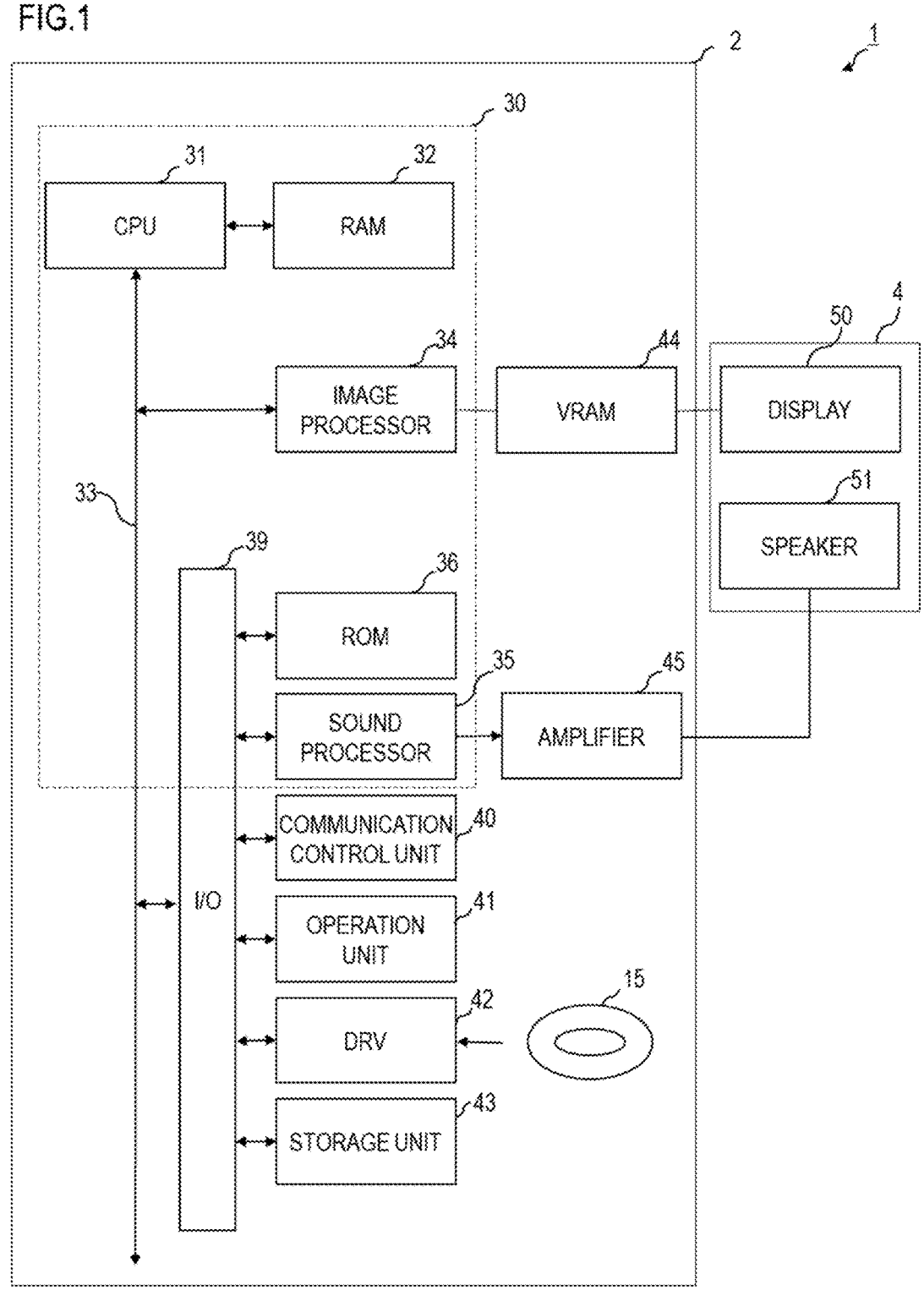
FIG. 1 is a block diagram illustrating a configuration of a game system according to one embodiment of the invention.

FIG. 1 is a block diagram illustrating a configuration of a game system 1 according to the present embodiment. The game system 1 includes a game device 2 and a display device 4, and executes a predetermined video game (a game). The game device 2 reads a game program from a non-transitory recording medium 15 having the game program recorded thereon, and executes the game, and causes a generated game image to be displayed on the display device 4. The non-transitory recording medium 15 may be, for example, a compact disc (CD), a digital versatile disc (DVD), a Blu-ray Disc (registered trademark) or a hard disk.

In a video game executed by the game system 1 of the present embodiment, a player character which is one of objects performs actions of "walking," "running," and "jogging." Regarding "walking" and "running" among these actions, motion data for causing the player character to perform these actions exist in advance. When the player character is caused to "jog," i.e., an action between "walk" and "run," motion data for "walking" and motion data for "running" are blended to generate the action "jogging." A virtual three-dimensional space including the player character is displayed on the display device 4. Either one of two sets of sequence data associated with two sets of motion data are selected (switched), and an effect caused by the action of the player character is appropriately produced with reference to selected sequence data. In the present embodiment, a sound effect is output from a speaker 51 as the effect. Details will be described later. In the invention, an intermediate action is not limited to "jog" that is an intermediate action between "walk" and "run."

The game device 2 includes, as illustrated in FIG. 1, a control unit 30, a communication control unit 40, an operation unit 41, a driver (DRV) 42 and a storage unit 43, on a bus 33 and an input/output (I/O) port 39. The control unit 30 includes a central processing unit (CPU) 31, random access memory (RAM) 32, read only memory (ROM) 36, an image processor 34 and a sound processor 35.

The CPU 31 controls operation of the entire device. Various sets of data are stored in the RAM 32 in accordance with the progress of the game. A system program to implement a basic function of the game device 2 is stored in the ROM 36. The image processor 34 is provided with a graphics processing unit (GPU). The image processor 34 generates a game space in accordance with an instruction of the CPU 31, and draws an image obtained by capturing this game space with a virtual camera on video RAM (VRAM) 44 as a game image. A display 50 of the display device 4 is connected to the VRAM 44. The display 50 is, for example, a liquid crystal display, and displays the game image, etc., drawn on the VRAM 44. An amplifier 45 including a digital to analog converter is connected to the sound processor 35, and a speaker 51 which is built in the display device 4 is connected to the amplifier 45.

The communication control unit 40 communicates with other game devices via a network such as the Internet. The operation unit 41 is, for example, a game pad provided with an operation button group and an analog stick. The operation unit 41 receives operations to the game from a user and produces operation signals in accordance with the received operations. The generated operation signals are input into the CPU 31. The driver 42 reproduces the data recorded on the recording medium 15 and decodes the data. The storage unit 43 is, for example, a hard disk and stores information about the user regarding the game.

Next, the game that will be provided by the game device 2 when the game program is executed will be described. In the game of the present embodiment, in accordance with the operation by the user with the operation unit 41, the player character generated in the virtual three-dimensional space (the game space) defined by three-dimensional coordinates (X, Y, Z) is made to perform various actions including walking, running, and attacking with a weapon.

Actions (motion) performed by the player character are executed (reproduced) in accordance with motion data M1 and motion data M2 (collectively "motion data M") as illustrated in FIG. 2A. In this embodiment, the motion data M corresponding to each of a plurality of actions is included in the game program as the game data. FIG. 2A is a diagram illustrating an example of two sets of motion data M1 and M2 for walk and run. Data (posture information) for determining postures of the player character is registered in the motion data M in association with the frame numbers arranged in time series from the first frame to the mth frame (nth frame) as illustrated in FIG. 2A. The posture information includes, for example, position information of joints that form the player character.

The frames from the first frame to the mth frame (nth frame) correspond to, for example, the number of reproduction frames that form a single unit of action. For example, regarding the motion data for walk M1 illustrated in FIG. 2A, an action of putting the right foot and the left foot of the player character alternately forward one by one is a single unit of action using the data of the frames from the first frame to the mth frame. Similarly, regarding the motion data for run M2, an action of putting the right foot and the left foot of the player character alternately forward one by one is a single unit of action using the data of the frames from the first frame to the nth frame. The total number of frames of a single unit of action in each action may be different among the actions (m n).

Sequence data S1 and sequence data S2 (collectively "sequence data S") as illustrated in FIG. 2B are associated with the motion data M on a one-on-one-basis. The sequence data S is data for producing an effect caused by an action while the player character is performing the action. The sequence data S1 is associated with the motion data for walk M1, and produces the sound of footsteps when the walking player character touches the ground as the effect (the sound effect). The sequence data S2 is associated with the motion data for run M2, and produces the sound of footsteps when the running player character touches the ground as the effect (the sound effect).

Information about effect production timing and a correction period is registered in the sequence data S in association with the same frame number as that of the correlated motion data.

For example, with reference to the sequence data S1 and the sequence data S2, the sound of footsteps (the sound effect) is output in response to the actions, i.e., walk and run, of the player character PC as illustrated in FIGS. 3A and 3B. FIG. 3A is an explanatory view illustrating a relationship between the walking action and the sound of footsteps of the player character PC. FIG. 3B is an explanatory view illustrating a relationship between the running action and the sound of footsteps of the player character PC. In each of FIGS. 3A and 3B, a sequential change of the action (posture) of the player character PC is illustrated, and a frame sequence in which rectangular frames each representing a single frame are arranged in time series is displayed. The first frame of each figure corresponds to a frame in which the player character starts the action. Grayed frames (frames) are frames in which the sound of footsteps is produced. That is, the frame sequence corresponds to the sequence data S1.

As illustrated in FIG. 3A, after the player character PC starts a walking action in accordance with the motion data M1, timing at which the sound of footsteps is produced reaches in a frame in which the right foot of the player character PC steps forward and touches the ground again. The same is true for the running action illustrated in FIG. 3B.

The correction period of the sequence data S is a period in which the number of times of produced sound of footsteps is to be adjusted. In the sequence data S, end timing of the correction period and information about the designated number of times are associated, as data for each frame, with the frame number that corresponds to the timing at which the correction period is started. The end timing is, for example, information about a frame number in which the correction period is to be ended. The designated number of times (a predetermined number of times) is the number of times of produced sound of footsteps in the correction period. In the present embodiment, the designated number is 1. The correction period is set when the player character is made to perform an action in which a plurality of sets of motion data M is blended. Details will be described later.

An example of action in which two sets of motion data M are blended may include, for example, a jogging action in which motion data for walk M1 and motion data for run M2 are blended. When mixing these actions, a length (i.e., the total number of frames) is adjusted in advance so that two actions correspond to each other in accordance with the blend rate. Note that a configuration of causing a player character to perform an action in which two sets of motion data M are blended is well known, and therefore detailed description thereof is not given.

When causing a player character to perform an action in which two sets of motion data M are blended, either of the two sets of sequence data S associated with the two sets of motion data M is selected. Then, the selected sequence data S is referred to and an effect caused by the action of the player character is produced. More specifically, either one of the two sets of sequence data S is selected (switched) depending on a blend condition. That is, the two sets of the sequence data S are not blended and either one of them is used.

For example, for the jogging action described above, either of the sequence data S1 or the sequence data S2 is selected in accordance with a moving speed of the player character who is jogging. When the moving speed is lower than a predetermined speed, the sequence data S1 is selected as jogging near walking. When the moving speed is equal to or higher than the predetermined speed, the sequence data S2 is selected as jogging near running. When the moving speed is changed from the speed less than the predetermined speed to the speed equal to or higher than the predetermined speed while the player character is jogging, selection is changed from the sequence data S1 to the sequence data S2. The moving speed is changed in accordance with the blend rate between the motion data for walk M1 and the motion data for run M2.

Figure 4:
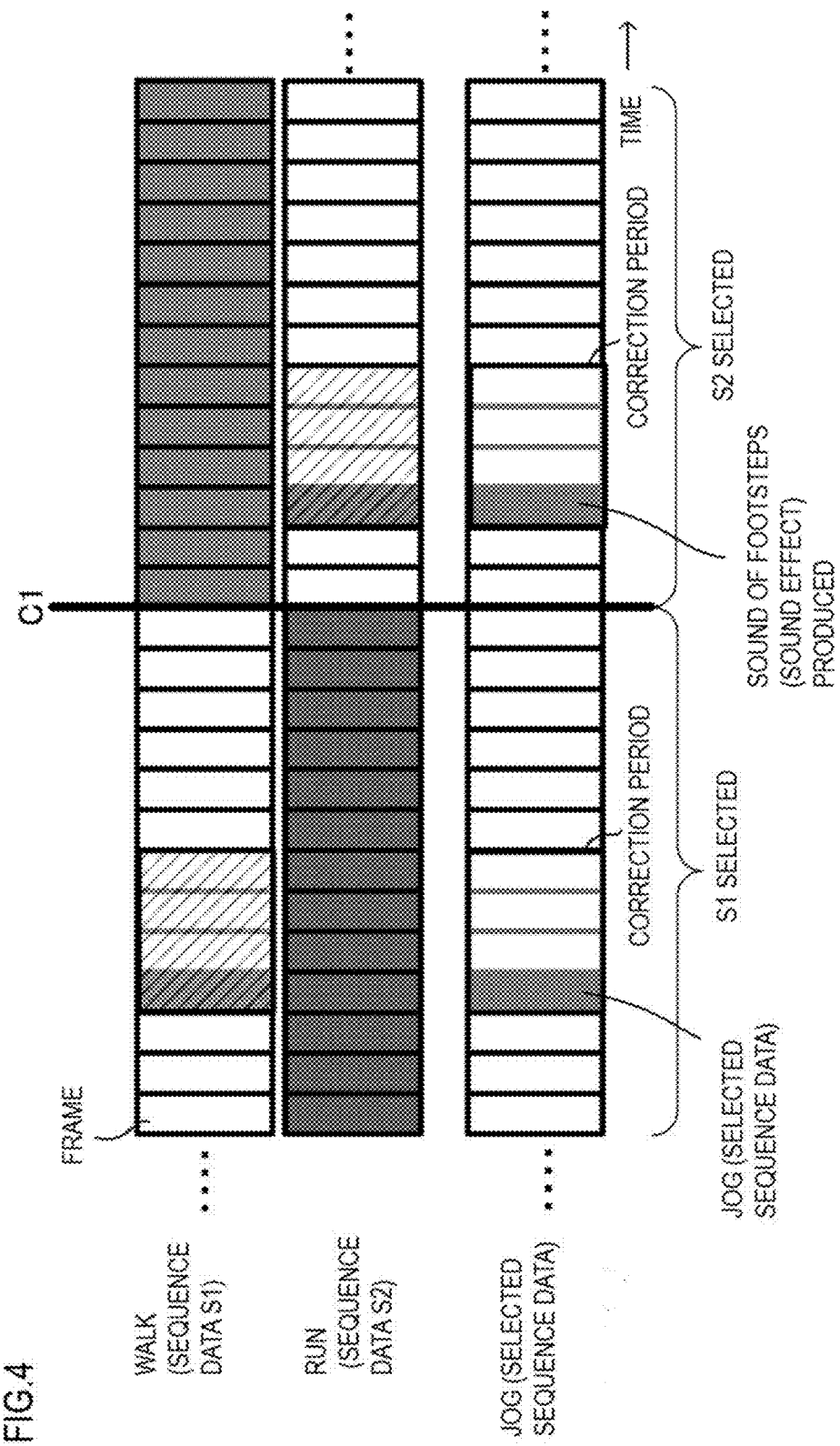
FIG. 4 is an explanatory view illustrating a relationship between a jogging action and sound of footsteps of a player character.
Figure 5:
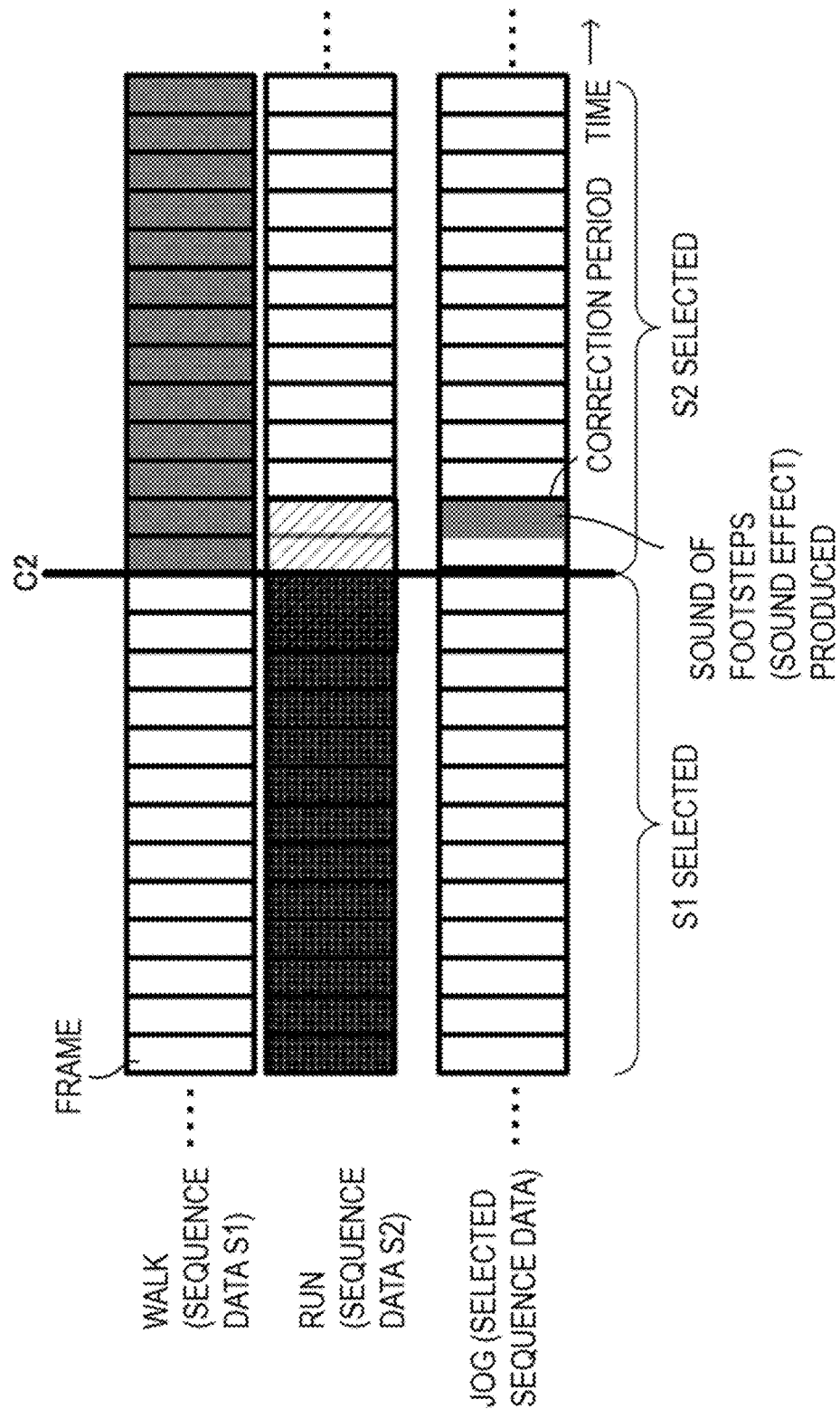
FIG. 5 is an explanatory view illustrating a relationship between a jogging action and sound of footsteps of a player character.
Figure 6:
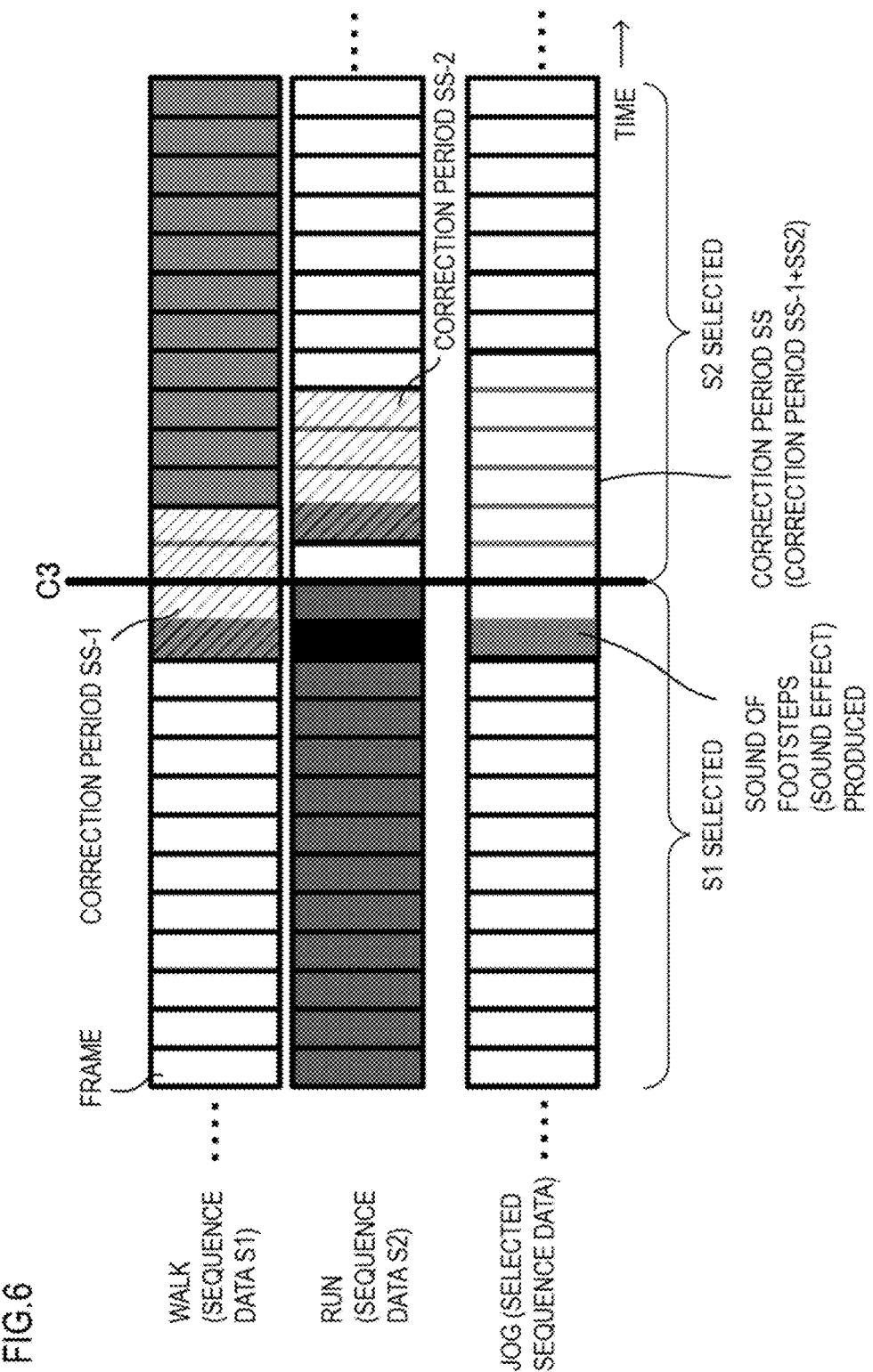
FIG. 6 is an explanatory view illustrating a relationship between a jogging action and sound of footsteps of a player character.

A case in which the sequence data S1 and the sequence data S2 are switched while the player character is in action will be described with reference to FIGS. 4 to 6. Each of FIGS. 4 to 6 is an explanatory view illustrating a relationship between the jogging action and the sound of footsteps of the player character PC. Each of FIGS. 4 to 6 illustrates switching from a state in which the sequence data S1 is selected into a state in which the sequence data S2 is selected while the player character PC is in the jogging action.

An upper frame sequence in each of FIGS. 4 to 6 corresponds to the sequence data for walk S1, and a middle frame sequence corresponds to the sequence data for run S2. A lower frame sequence indicates that which of the sequence data S1 and the sequence data S2 has been selected in accordance with the moving speed.

First, an example of FIG. 4 will be described. In FIG. 4, sound of footsteps is output in accordance with the sequence data S1 in the frames before C1 which indicates a switch point, and sound of footsteps is output in accordance with the sequence data S2 after C1. The correction period is set based on each of the sequence data S1 and the sequence data S2. In the correction period, the cumulative number of times of produced sound of footsteps is 1, and the condition that "designated number of times: 1" is satisfied.

Next, an example illustrated in FIG. 5 will be described. In FIG. 5, the correction period corresponding to two frames is set immediately after a switch point C2 based on the sequence data S2 switched at or after the switch point C2. In this example, production timing of the sound of footsteps is set before two flames of the switch point C2 in the sequence data S2, while production timing of the sound of footsteps is not set in the correction period immediately after the switch point C2. Therefore the sound of footsteps will not be produced in the correction period, but, the condition that "designated number of times: 1" is not satisfied because the cumulative number of times of production is zero, and the sound of footsteps is output in the end frame of the correction period.

Therefore, because the effect can be produced by the correction period when the sets of the sequence data S are switched immediately after the production timing of the effect passed, it is prevented that the effect in accordance with the operation of the player character PC is not produced.

Next, an example illustrated in FIG. 6 will be described. In FIG. 6, a correction period SS-1 is started based on the sequence data S1 immediately before the switch point C3, but the sequence data S1 is switched to the sequence data S2 before the end timing (the end frame) reaches. In this case, the already started correction period SS-1 is kept to the end timing without being ended. Then, at or after the switch point C3, a correction period SS-2 is started newly based on the sequence data S2. Here, the start frame of the correction period SS-2 is the same as the end frame of the correction period SS-1. Therefore, the correction period SS-1 and the correction period SS-2 overlap each other. When the correction periods SS-1 and SS-2 overlap each other, these correction periods are considered as a single correction period SS. That is, the designated number of times is 1 in a single correction period SS.

Therefore, the sound of footsteps should be output in the start frame of the correction period SS-2 based on the sequence data S2. However, since the sound of footsteps is output in the start frame of the correction period SS-1 and the cumulative number of times of production is 1, the sound of footsteps is not output in the start frame of the correction period SS-2. Therefore, it can be prevented that the sound of footsteps is output twice in a short time and that an effect that does not correspond to (i.e., shifted from) the action of the player character PC is produced.

The same is true for a case in which the sequence data S2 is switched to the sequence data S1. When the sets of the sequence data S are not switched while the player character PC is in action, the correction period is set, but an effect is produced based on the selected sequence data S as in an action based on a single motion data M described above.

In the present embodiment, the start frame in the correction period is set at the production timing of the sound effect, but the start frame of the correction period is not limited to the same and may be changed appropriately.

Figure 7:
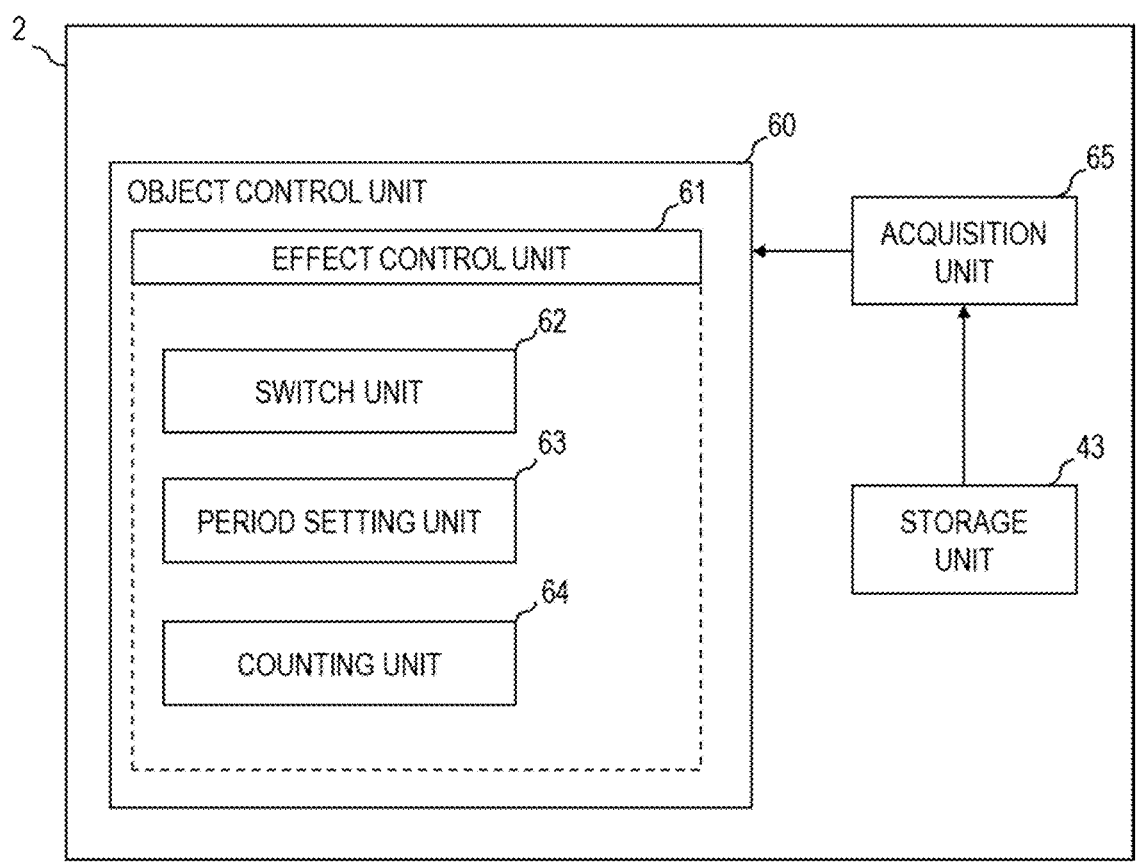
FIG. 7 is a functional block diagram of the game system.

FIG. 7 is a functional block diagram of the game device 2 according to the present embodiment. The game device 2 functions at least as an object control unit 60, an effect control unit 61, a switch unit 62, a setting unit 63, a counting unit 64, an acquisition unit 65, and the storage unit 43 in cooperation with the game program.

The object control unit 60 controls actions of a player character PC. More specifically, the motion data M of the action depending on the game situation is acquired from the storage unit 43 via the acquisition unit 65, and the action of the player character PC is controlled in accordance with the motion data M. The game situation may include, for example, operation information (operation signals) of the operation unit 41 by the user with respect to the player character PC, environment of a game space.

The effect control unit 61 refers to the sequence data S associated with the motion data M while the player character PC is in action and produces the sound effect (the sound of footsteps). While the player character PC is in action in which two sets of motion data M are blended, the switch unit 62 switches from the sequence data S associated with these sets of motion data M to the sequence data S depending on the blend condition (e.g., the moving speed). The period setting unit 63 causes the correction period to start and sets the end timing and the designated number of times with reference to the selected (switched) sequence data S. The counting unit 64 counts the cumulative number of times of production in the correction period. The acquisition unit 65 reads the game data in the storage unit 43 and transmits the game data to the object control unit 60, etc. The switch unit 62, the period setting unit 63, and the counting unit 64 may be included in the effect control unit 61.

Figure 8:
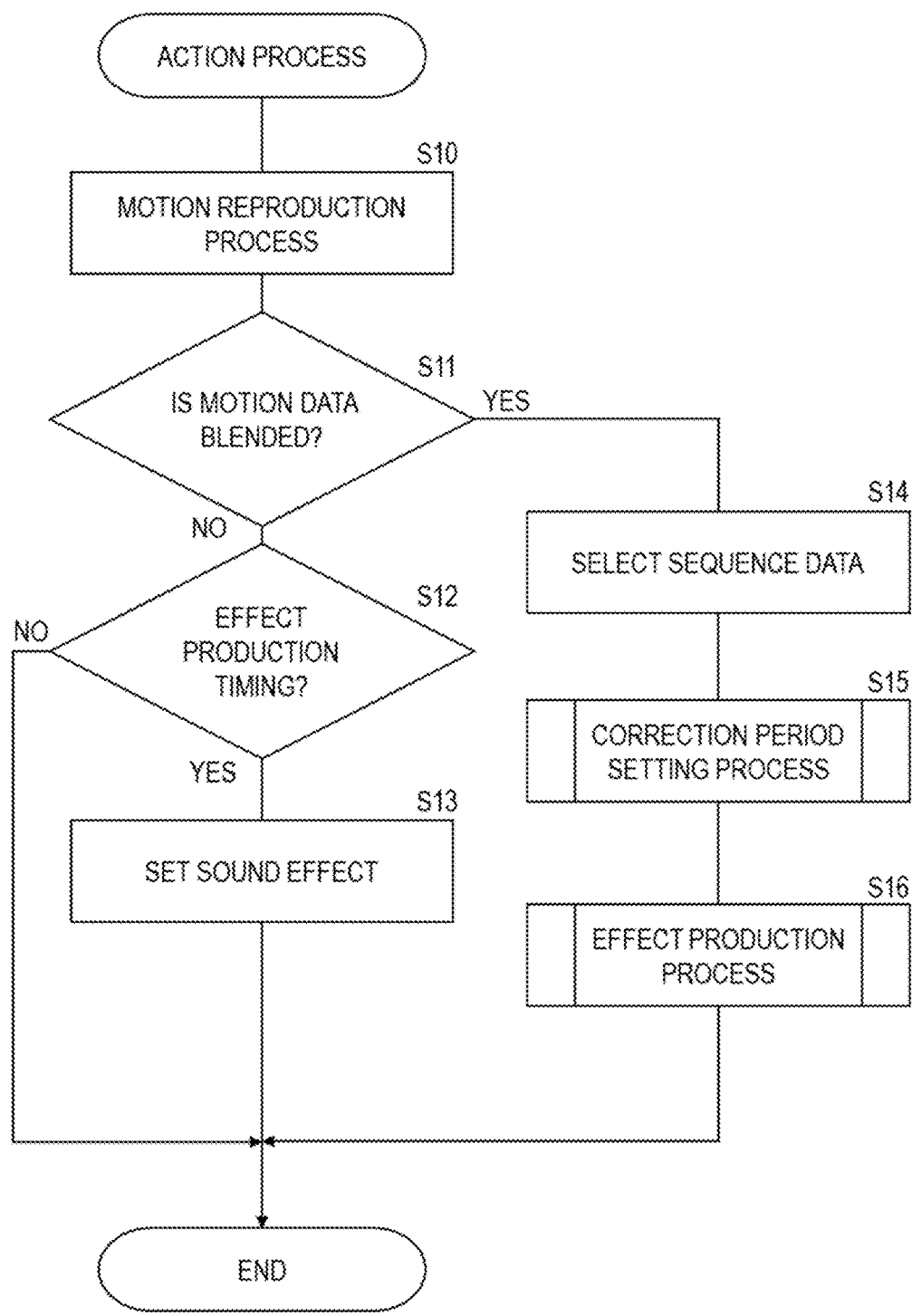
FIG. 8 is a flowchart illustrating an action process of the player character of the game system.
Figure 9:
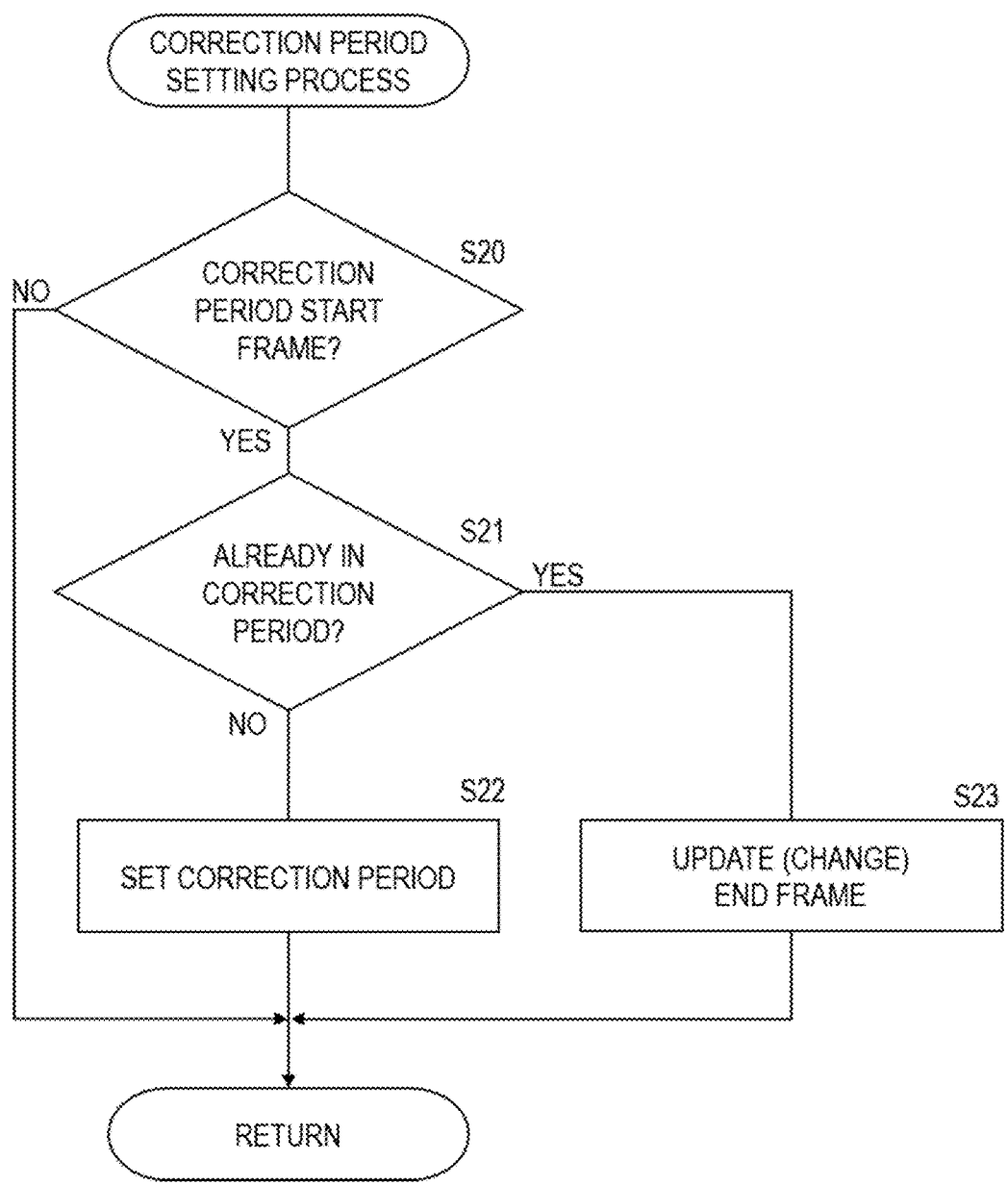
FIG. 9 is a flowchart illustrating a correction period setting process of the player character of the game system.
Figure 10:
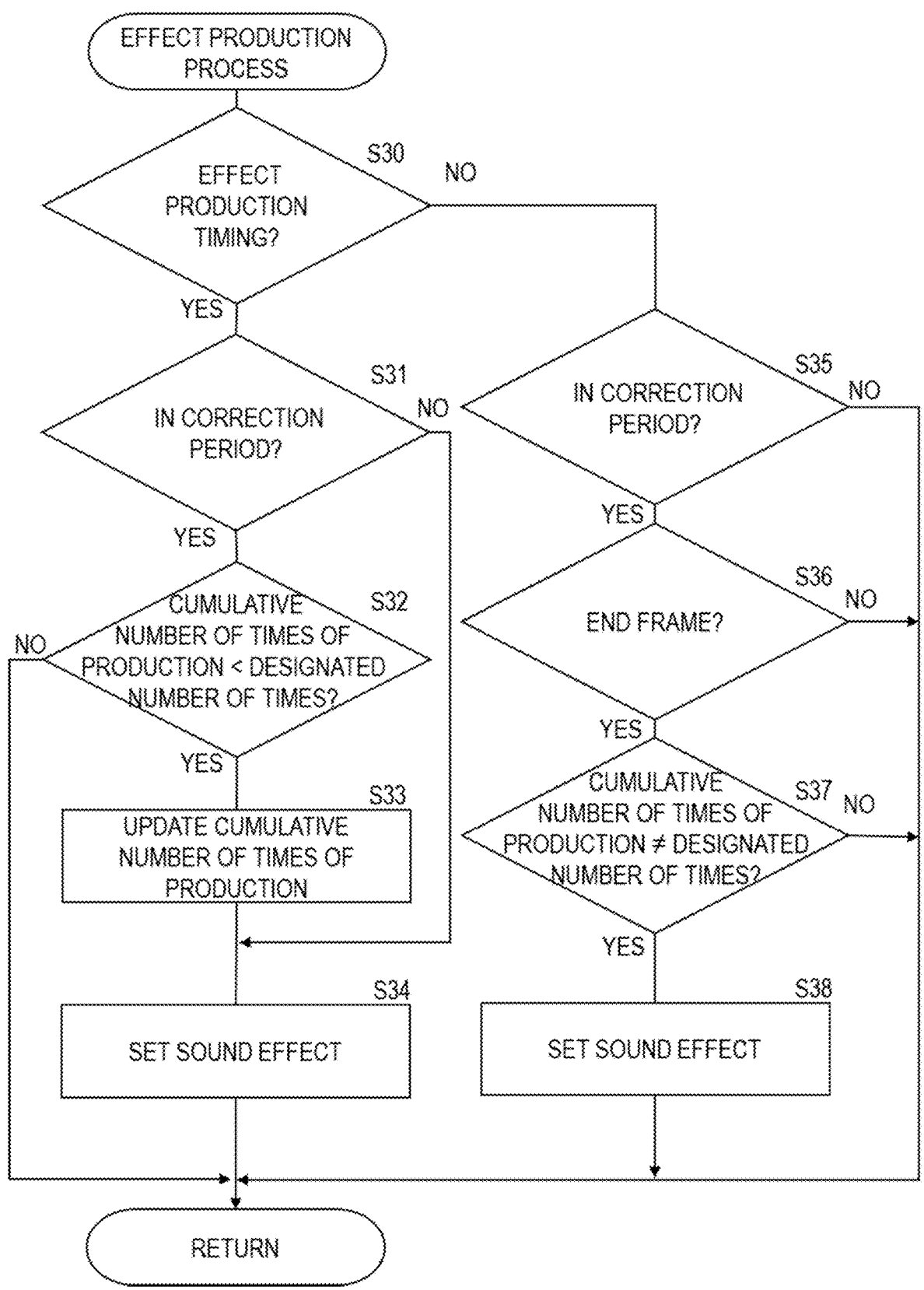
FIG. 10 is a flowchart illustrating an effect production process of the player character of the game system.

Next, with reference to the flowcharts of FIGS. 8 to 10, an operation process of the above-described player character PC will be described. FIG. 8 is a flowchart illustrating an action process of the player character PC according to the present embodiment. FIG. 9 is a flowchart illustrating a reproduction period setting process of the player character PC according to the present embodiment. FIG. 10 is a flowchart illustrating an effect production process of the player character PC according to the present embodiment. The action process illustrated in FIG. 8 is performed on the one frame (e.g., 1/60 sec) unit repeatedly, and the action of the player character PC is updated on the one frame unit. This action process is executed mainly by the object control unit 60. The processes illustrated in FIGS. 9 and 10 are subroutine processes of the action process.

The object control unit 60 first performs a motion reproduction process (step S10). In the reproduction process, the motion data M is acquired depending on the game situation as described above, and the player character PC is caused to perform actions. More specifically, a posture of the player character PC in the subsequent frame is generated. Finally, a game image including the player character PC in the generated posture is displayed on the display device 4.

Then, the object control unit 60 determines whether the action in the motion reproduction process is an action caused by a blend of two sets of motion data M (step S11). If the action is caused by a single set of motion data M (step S11: NO), the object control unit 60 refers to the sequence data S associated with the motion data M used in the reproduction process and determines whether it is sound effect production timing (step S12). More specifically, the object control unit 60 determines whether the subsequent frame is a sound effect production frame. The number of frames synchronize with a reproduction frame number of the action in the reproduction process.

Upon determination that it is the production timing (step S12: YES), the object control unit 60 performs setting to produce a sound effect (step S13), and ends the action process. Finally, the sound effect is output in accordance with the display of the game image. Upon determination that it is not the production timing (step S12: NO), the object control unit 60 ends the action process.

Upon determination in step S11 that the action is caused by a blend of two sets of motion data M, the object control unit 60 selects the sequence data S (step S14). As described above, the object control unit 60 switches (selects) the two sets of sequence data S associated with the operating two sets of motion data M depending on the blend condition. Then, the object control unit 60 performs a correction period setting process illustrated in FIG. 9 and an effect production process illustrated in FIG. 10 in this manner (steps S15 and S16).

In the correction period setting process, the object control unit 60 refers to the selected sequence data S as shown in FIG. 9, and determines whether the subsequent frame is a start frame of the correction period (step S20). Upon determination that the subsequent frame is not a start frame of the correction period (step S20: NO), the object control unit 60 ends the correction period setting process and proceeds to the effect production process of step S16.

Upon determination that the subsequent frame is a start frame of the correction period (step S20: YES), the object control unit 60 determines whether it is already in the correction period (step S21). For example, the object control unit 60 may determine whether correction period information has been already set and the frame number of the subsequent frame is within the frame number of the end frame. If it is not in the correction period (step S21: NO), the object control unit 60 newly performs an initiation setting of the correction period (step S22). More specifically, the correction period information is set. For example, the object control unit 60 sets the start frame and the end frame (the frame number) of the correction period, the designated number of times (one), and sets the cumulative number of times of production to zero.

Upon determination that it is already in the correction period (step S21: YES), the object control unit 60 changes the end frame in the correction period information which has been already set (step S23). Note that the object control unit 60 does not reset the cumulative number of times of production, etc. Therefore, as in the example illustrated in FIG. 6, a new correction period is continuingly started instead of the already started correction period.

After the correction period setting process ends, the object control unit 60 starts the effect production process illustrated in 10 in step S16. First, the object control process 60 determines whether it is sound effect production timing (step S30). More specifically, the object control process 60 refers to the selected sequence data S and determines whether the subsequent frame is a frame that produces an effect. If it is the timing to produce a sound effect (step S30: YES), the object control unit 60 determines whether it is currently the correction period (step S31). For example, as described above, the object control unit 60 may determine whether the correction period information has been already set and the frame number of the subsequent frame is within the frame number of the end frame.

If it is not currently a correction period (step S31: NO), the object control unit 60 performs setting to produce a sound effect as in the above-described step S13 (step S34), and ends the effect production process. If it is currently a correction period (step S31: YES), the object control unit 60 determines whether the cumulative number of times of produced sound effects is smaller than the designated number of times (step S32). If the cumulative number of times of produced sound effects is smaller than the designated number of times (step S32: YES), the object control unit 60 adds 1 to the cumulative number of times of produced sound effects (step S33) and performs setting to produce a sound effect (step S34).

If the cumulative number of times of produced sound effects is equal to or higher than the designated number of times (step S32: NO), the object control unit 60 ends the effect production process without producing a sound effect.

Upon determination in step S30 that it is not production timing, the object control unit 60 determines whether it is currently the correction period as in the above-described step S31 (step S35). When it is not currently the correction period (step S35: NO), the object control unit 60 ends the effect production process. When it is currently the correction period (step S35: YES), on the other hand, the object control unit 60 determines whether the subsequent frame is the end frame of the correction period (step S36). If the subsequent frame is not the end frame (step S36: NO), the object control unit 60 ends the effect production process. If the subsequent frame is the end frame (step S36: YES), the object control unit 60 determines whether the cumulative number of times of produced sound effects is equal to the designated number of times (one) (step S37). If the cumulative number of times of produced sound effects is not equal to the designated number of times (step S37: NO), the object control unit 60 performs setting to produce a sound effect as in step S34 or other steps (step S38) and ends the effect production process. In this manner, as in the example illustrated in FIG. 5, the sound effect can be produced at timing that is not sound effect production timing.

The designated number of times is set to 1 in the present embodiment, but the designated number of times may be 2 or larger. In this case, the process of step S37 from the frame previous to the end frame by the designated number of times may be performed. For example, when the designated number of times is set to 2, it may be determined whether the cumulative number of times of production is equal to the designated number of times in the frame previous to the end frame and in the end frame. Each correction period may have a value of the designated number of times different from one another.

As described above, when causing the object (the player character PC) to perform an action in which two sets of motion data M are blended, either one of sequence data S associated with each set of motion data M can be selected and an effect caused by the action of the player character PC can be appropriately produced.

The sound of footsteps is output as the sound effect in the above-described embodiment, but the sound effect is not limited to the sound of footsteps. For example, a rubbing sound of clothes or protective gear which the player character is equipped with may be output as a sound effect. Note that the effect is not limited to a sound effect, and may be any effect caused by an action of the player character. For example, an effect of an image may be produced. More specifically, in the jogging action described above, an effect image of dust may be displayed at timing at which the foot of the player character touches the ground. Also, a so-called hit feel (hit feel judgment) may be produced as an effect. For example, when causing the player character to perform an action to hit, in a frame at the beginning of a hit motion, a hit feel with low offensive power is set around the fist of the player character, and in a frame at the end of the hit motion, a hit feel with high offensive power is set around the fist of the player character. Therefore, when it is determined that the fist of the player character has hit an opponent character, etc., at the beginning of hitting, damage to the opponent character is small, when it is determined that the fist has hit the opponent character at the end of hitting, damage to the opponent character is larger than that given at the beginning of hitting.

Also, description is made using a player character as an object in the above-described embodiment. However, any object acting based on motion data in a game space is applicable to the invention.

Two sets of motion data are blended in the above-described embodiment. However, three or more sets of motion data may be blended. In this case, either one of three or more sets of sequence data associated with these sets of the motion data may be selected depending on a blend condition.

Information like production timing of an effect included in the sequence data S of the above-described embodiment is previously set by a manufacturer of the video game. However, such information may be automatically set by a computer. Then, the manufacturer may modify the computer-generated sequence data. Finally, in the game system of the above-described embodiment, the game device performs a game alone, but the game system is not limited to the same. For example, the game system may be an online game system in which the game device is connected to a game server device via the Internet, etc. In this case, the action processes illustrated in FIGS. 8 to 10 may be performed in the game server device. Alternatively, the game server device and the game device may cooperatively perform the action process.

INDUSTRIAL APPLICABILITY

The invention is useful, when causing an object to perform, in a video game, an action in which two or more sets of motion data are blended, to appropriately produce an effect caused by the action using sequence data associated with each set of motion data.

DESCRIPTION OF REFERENCE NUMERALS

1: Game system
2: Game device
4: Display device
43: Storage unit
50: Display
60: Object control unit
61: Effect control unit
62: Switch unit
63: Correction period setting unit
64: Counting unit
M (M1, M2): Motion data
S (S1, S2): Sequence data

The invention claimed is:

1. A non-transitory computer-readable recording medium storing a game program for driving a computer to function as:
   an acquisition means configured to acquire, from a storage unit, a plurality of sets of motion data that cause an object in a game space to perform an action, and sequence data associated with each set of the motion data;
   an object control means configured to cause the object to perform the action based on the plurality of sets of motion data and information which is a blend of two or more sets of the plurality of sets of motion data;
   a switch means configured to switch among two or more sets of the sequence data associated with each of two or more of the plurality of sets of motion data depending on a blend condition;
   a counting means configured to count a cumulative number of times of produced effects in a correction period before switching the sequence data by the switch means; and
   an effect control means configured to produce no effect in the correction period after the switch of the sequence data if a predetermined number of times of effects has produced before the switch, and produce the predetermined number of times of effects in the correction period after the switch of the sequence data if the predetermined number of times of effects have not produced before the switch,
   wherein the sequence data includes production timing of an effect to be produced during the action of the object based on the motion data and information about the correction period in which a cumulative number of times of the produced effects during the period is set to the predetermined number of times in time series.

2. The recording medium according to claim 1, wherein start timing of the correction period is the same as that of the production timing of the effect.

3. The recording medium according to claim 1, wherein the switch means switches sets of the sequence data depending on a blend rate of the two or more sets of the plurality of set of motion data as the blend condition.

4. The recording medium according to claim 1, wherein the effect is a sound effect produced with the action of the object.

5. The recording medium according to claim 4, wherein the object is a character which can walk,
   the plurality sets of motion data to be blended are motion data for walking and motion data for running, and
   the sound effect is sound of footsteps when a foot of the object touches a ground.

6. An effect control method comprising:
- a first step to acquire, from a storage unit, a plurality of sets of motion data that cause an object in a game space to perform an action, and sequence data associated with each set of the motion data;
- a second step to cause the object to perform the action based on the plurality of sets of motion data and information which is a blend of two or more sets of the plurality of sets of motion data;
- a third step to switch among two or more sets of the sequence data associated with each of two or more of the plurality of sets of motion data depending on a blend condition;
- a fourth step to produce the effect with reference to the sequence data switched in the third step;
- a fifth step to count a cumulative number of times of produced effects in a correction period before switching the sequence data in the third step; and
- a sixth step to produce no effect in the correction period after the switch of the sequence data if a predetermined number of times of effects has produced before the switch, and produce the predetermined number of times of effects in the correction period after the switch of the sequence data if the predetermined number of times of effects have not produced before the switch,
- wherein the sequence data includes production timing of an effect to be produced during the action of the object based on the motion data and information about the correction period in which a cumulative number of times of the produced effects during the period is set to the predetermined number of times in time series.

7. A game device comprising:
- a storage unit configured to store a plurality of sets of motion data that cause an object in a game space to perform an action, and sequence data associated with each set of the plurality of sets of motion data;
- an acquisition unit configured to acquire the plurality of sets of motion data and the sequence data from the storage unit;
- an object control unit configured to cause the object to perform the action based on the plurality of sets of motion data and information which is a blend of two or more sets of the plurality of sets of motion data;
- a switch unit configured to switch among two or more sets of the sequence data associated with each of two or more of the plurality of sets of motion data depending on a blend condition;
- a counting unit configured to count a cumulative number of times of produced effects in a correction period before switching the sequence data by the switch unit; and
- an effect control unit configured to produce no effect in the correction period after the switch of the sequence data if a predetermined number of times of effects has produced before the switch, and produce the predetermined number of times of effects in the correction period after the switch of the sequence data if the predetermined number of times of effects have not produced before the switch,
- wherein the sequence data includes production timing of an effect to be produced during the action of the object based on the motion data and information about the correction period in which a cumulative number of times of the produced effects during the period is set to the predetermined number of times in time series.

* * * * *